F. P. MILLER.
ICE CREAM MAKING MACHINE.
APPLICATION FILED JULY 19, 1913.
1,116,096.
Patented Nov. 3, 1914.
2 SHEETS—SHEET 1.
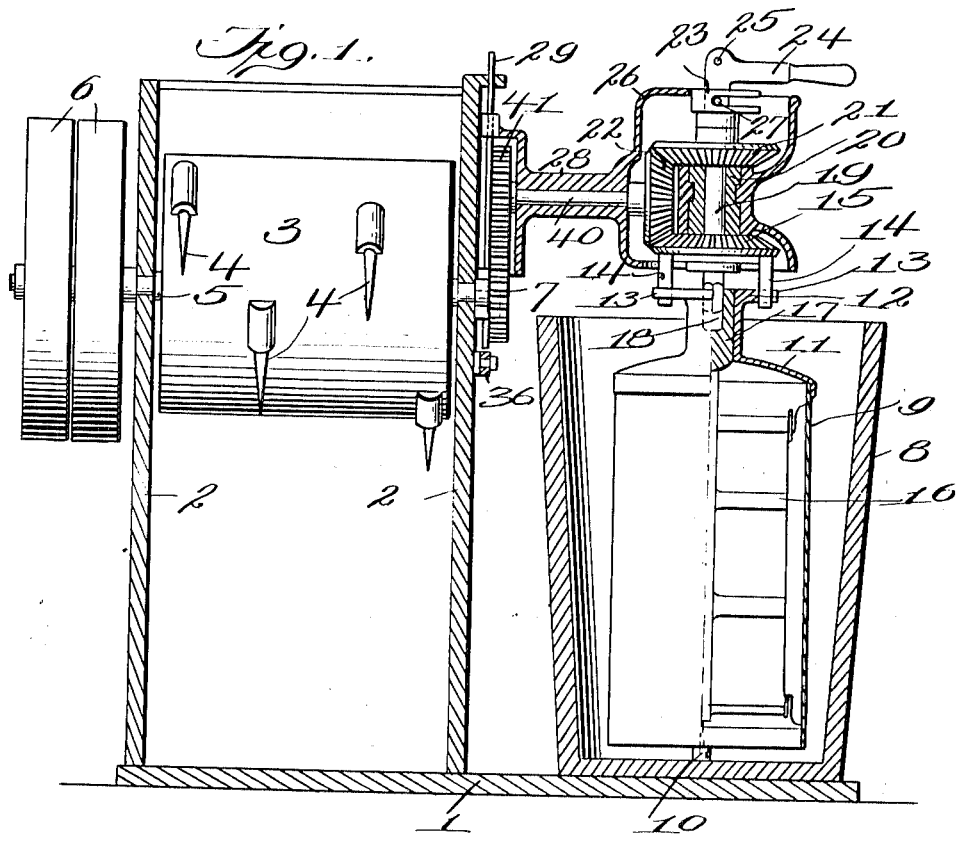
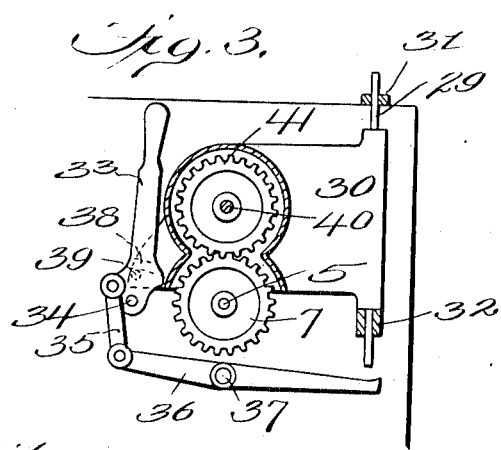
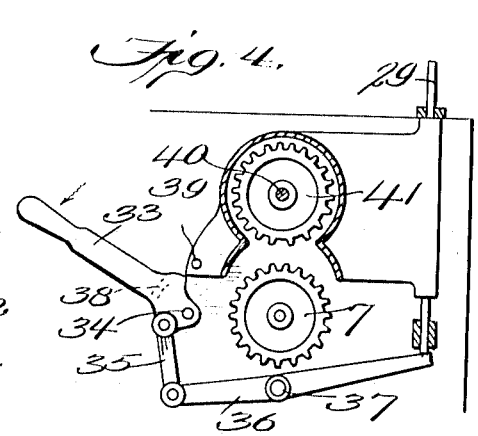
Witnesses:
Inventor
Franklin P. Miller F. P. MILLER.
ICE CREAM MAKING MACHINE.
APPLICATION FILED JULY 19, 1913.
1,116,096.
Patented Nov. 3, 1914.
2 SHEETS—SHEET 2.
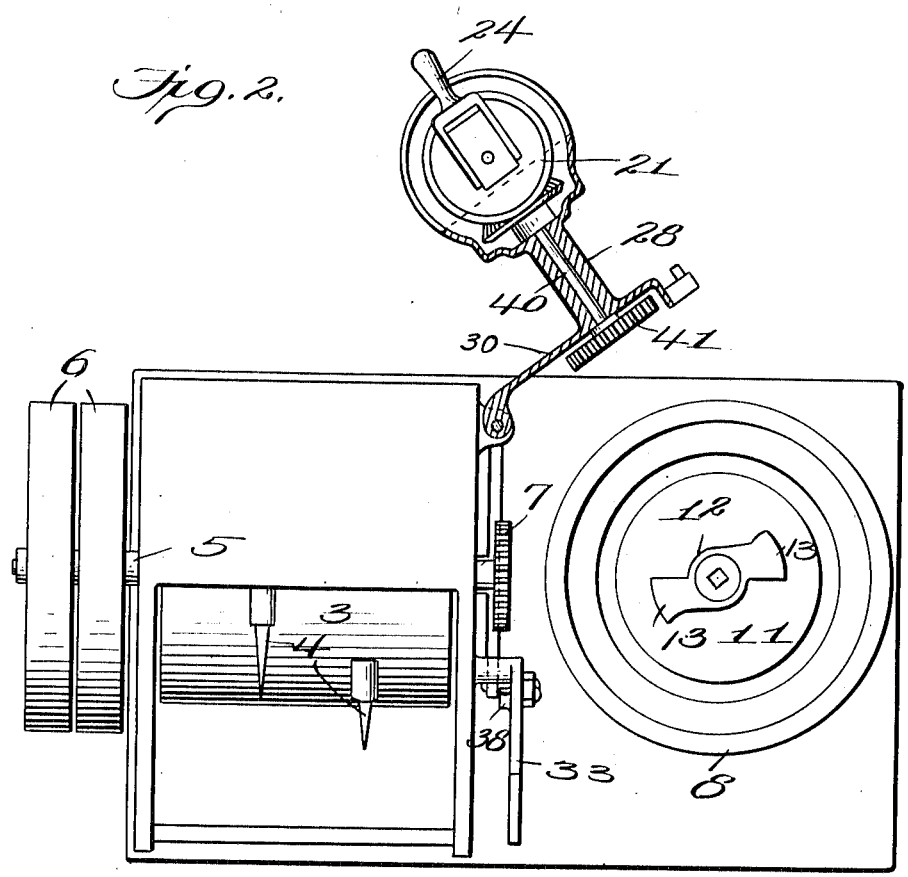
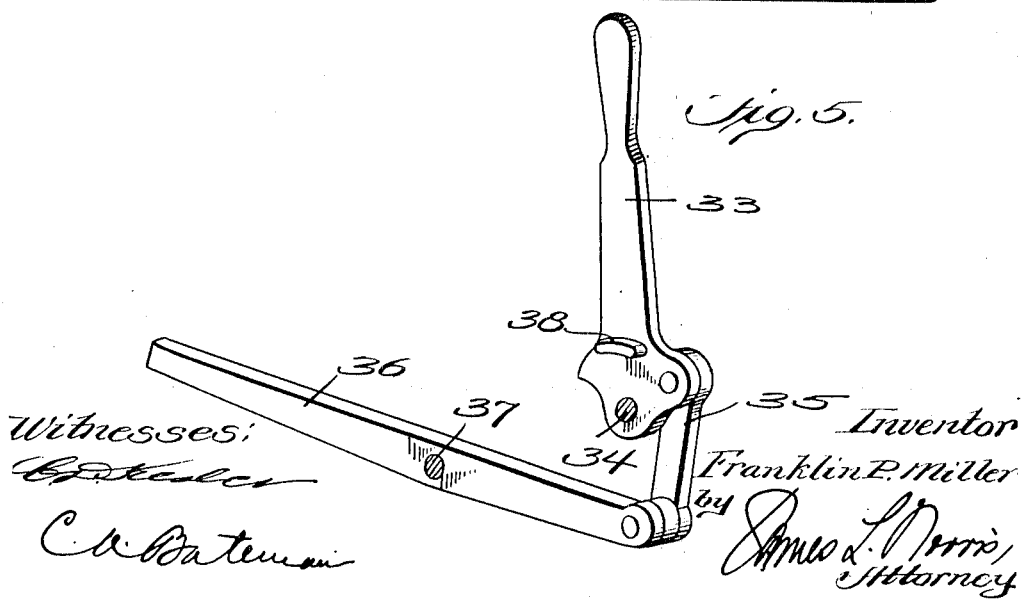

UNITED STATES PATENT OFFICE.

FRANKLIN P. MILLER, OF EAST ORANGE, NEW JERSEY.

ICE-CREAM-MAKING MACHINE.

1,116,096. Specification of Letters Patent. Patented Nov. 3, 1914.

Application filed July 19, 1913. Serial No. 780,061.

*To all whom it may concern:*

Be it known that I, FRANKLIN P. MILLER, a citizen of the United States, residing at East Orange, in the county of Essex and State of New Jersey, have invented new and useful Improvements in Ice-Cream-Making Machines, of which the following is a specification.

This invention relates to improvements in ice cream making machines, and the primary object of the invention is to provide improved means whereby the mechanism which drives the dasher and can in reverse directions can be readily swung into an inoperative position to enable the can or the contents thereof to be removed and returned to an operative position and locked when another can has been substituted, the present invention enabling this to be done without disturbing the tub containing the ice or refrigerating medium.

To these and other ends, the invention consists in certain improvements, and combinations and arrangements of parts, all as will be hereinafter more fully described, the novel features being pointed out particularly in the claims at the end of the specification.

In the accompanying drawings:—Figure 1 is an elevation, partly in section, of an ice cream making machine constructed in accordance with the present invention, the driving mechanism being shown in operative relation with the dasher and can of the freezer; Fig. 2 is a top plan view, partly in section, of the machine shown in Fig. 1, the driving mechanism for the dasher and can being shown in inoperative position; Figs. 3 and 4 are detail views, partly in section, showing the device provided by the present invention for locking and unlocking the freezer driving mechanism; Fig. 5 is a detail perspective view of a portion of the locking mechanism.

Similar parts are designated by the same reference characters in the several views.

The present invention is applicable generally to ice cream making machines or freezers. In the present instance, the invention is shown in connection with an ice cream making machine which embodies a freezer and an ice breaker, these parts being mounted preferably on a base 1, the ice breaker embodying a casing 2 which forms a receptacle for the broken ice and a revoluble drum 3 having picks or teeth 4 thereon which operate to break the ice into small pieces suitable for packing around the freezer cans, the drum being mounted on a shaft 5 which carries tight and loose belt pulleys 6 by means of which the mechanism is driven. A gear 7 is also fixed on the shaft 5, this gear serving to operate the freezer. The freezer embodies a tub 8 which is mounted on and may be fixed to the base 1 and is adapted to contain broken ice or any suitable freezing agent. The freezer can 9 is mounted revolubly in the tub, it being supported at the bottom by a central pivot 10 and the upper end of the can is provided with a cover 11 having a head 12 fixed thereto and provided with oppositely extending shoulders 13 which coöperate with projections 14 attached to the can revolving gear 15. The dasher 16 within the can is adapted to be revolved in a reverse direction relatively to the direction of rotation of the can, the upper end of the dasher having a head 17 which is centered in the cover 11 of the can and is formed with a squared or angular socket 18 to receive the similarly formed end of the dasher-operating shaft 19. The shaft 19 extends loosely through the dasher-operating gear 15 and the bushing 20 and is splined on the gear 21, the gears 15 and 21 being revolved in reverse directions by the gear 22. The dasher-operating shaft 19 is movable vertically in order to engage and disengage its lower end relatively to the socket 18 of the dasher. In the construction shown, a slotted head 23 is mounted revolubly on the dasher-operating shaft 19, and a lever 24 is pivoted at 25 to a casing 26, the lever 24 having projections 27 arranged to coöperate with the slotted head 23 to lift the shaft 19 and thereby uncouple it from the dasher when the lever 24 is moved into a vertical position, and the shaft 19 will be lowered and coupled to the dasher when the lever 24 is moved into a horizontal position as shown in Fig. 1. The casing 26, together with the gears and other parts composing the freezer-operating mechanism, is mounted on an arm 28, and this arm is mounted to swing the freezer-operating mechanism to and from a position above the can in order to enable a can containing the frozen cream to be removed and another can substituted. This arm 28 in the construction shown is provided at one side with a pivot pin 29 which is fixed to a lateral extension 30 of the arm, the upper and lower ends of the pivot pin coöperating with bearings 31 and 32 fixed preferably to one of the walls of the casing 2 of the ice breaker. The pivot pin 29 is capable of vertical movement between the bearings 31 and 32 for the purpose of lifting the freezer-operating mechanism to disengage the projections 14 from the driving head 12 on the cover of the freezer can preparatory to swinging the arm and the freezer-operating mechanism laterally or to one side of the can, and after the arm 28 and the freezer-operating mechanism have been returned to a position above the freezer can, the arm, together with its operating mechanism, is lowered and thereby brought into driving relation with the freezer can.

The present invention provides a simple device whereby the arm 28 may be easily lifted and lowered and when in lowered position this device serves to lock the freezer-operating mechanism in driving condition. The device in the present instance embodies a handle 33 which is pivoted at 34 to the adjacent wall of the ice breaker casing, and this handle is connected by a link 35 to one end of a lever 36, this lever being pivoted at 37 to the casing of the ice breaker and its opposite end occupies a position immediately beneath the lower end of the pivot pin 29. The handle 33 is also provided with a rib 38, the lower surface of which is cam-shaped or formed eccentrically of the pivot 34, and a pin or projection 39 is formed on the adjacent portion of the arm 28 and is engaged by the rib 38 on the handle 33 as the latter is swung into the upright position as shown in Fig. 3, this rib and projection then operating to draw the arm 28 down and to lock it in such position whereby correct operative relation will be maintained between the freezer can and dasher and their operating devices. When the handle 33 is swung into the position shown in Fig. 4, the link 35 and lever 36 will be operated to lift the pivot pin 29, thereby elevating the arm 28 and the freezer-operating mechanism thereon and disengaging such mechanism from the freezer can. The dasher-operating shaft 19 is disengaged from the dasher by the handle 24. The handle 33 when swung into position to elevate the arm 28 also unlocks the projection 39. Elevation of the arm 28 also disconnects the freezer-operating mechanism from the driving gear 7 on the shaft of the ice breaker, the gear 22 being fixed to a shaft 40 and the shaft 40 carrying a gear 41 which is adapted to be shifted to and from operative relation with the gear 7 by lifting and lowering the arm 28. When the arm 28 has been elevated in the manner stated, the ice breaker may be used independently of the freezer. If it is desired to change the cans or to remove the contents of a can in the tub, the arm 28 is then swung to one side of the top of the can as shown in Fig. 2. By reversing this order of operations, the freezer-operating mechanism is returned to operative condition.

I claim as my invention:—

1. In an ice cream making machine, the combination of a freezer can and dasher, driving mechanism therefor, and an arm carrying said driving mechanism and mounted to swing laterally to and from operative position relative to the can and dasher, said arm being also movable vertically on its axis.

2. In an ice cream making machine, the combination of a freezer can and dasher, driving mechanism therefor, an arm carrying the driving mechanism and mounted to swing laterally relatively to the can and dasher, and means for elevating the arm carrying the driving mechanism to disengage the latter from the can.

3. In an ice cream making machine, the combination of a freezer can and dasher, driving mechanism therefor mounted to swing bodily laterally relatively thereto, and means for bodily elevating the driving mechanism to disengage it from the can and for locking such mechanism in operative relation with the can.

4. In an ice cream making machine, the combination of a freezer can and dasher, a pivoted arm movable laterally of the can and carrying can and dasher-operating mechanism, and means operative in one direction to unlock said arm and elevate the same and operative in a reverse direction to lower said arm and lock the driving mechanism thereon in coöperative relation with the can and dasher.

5. In an ice cream making machine, the combination of a freezer can and dasher, a drive shaft, operating mechanism for the can and dasher operative by said drive shaft, and means for shifting said mechanism to engage or disengage the same relatively to said drive shaft and also the can and dasher.

6. In an ice cream making machine, the combination of a drive shaft, a freezer having a can and dasher, and driving mechanism for the freezer bodily movable vertically to engage or disengage the same relatively to said shaft and also the can and dasher and movable laterally relatively to the can and dasher.

In testimony whereof I have hereunto set my hand in presence of two subscribing witnesses.

FRANKLIN P. MILLER.

Witnesses:
A. L. GOLDSPINK,
JAMES HENDERSON.